Feb. 17, 1942.  A. BOYNTON  2,273,017
RIGHT AND LEFT DRILL PIPE
Filed June 30, 1939
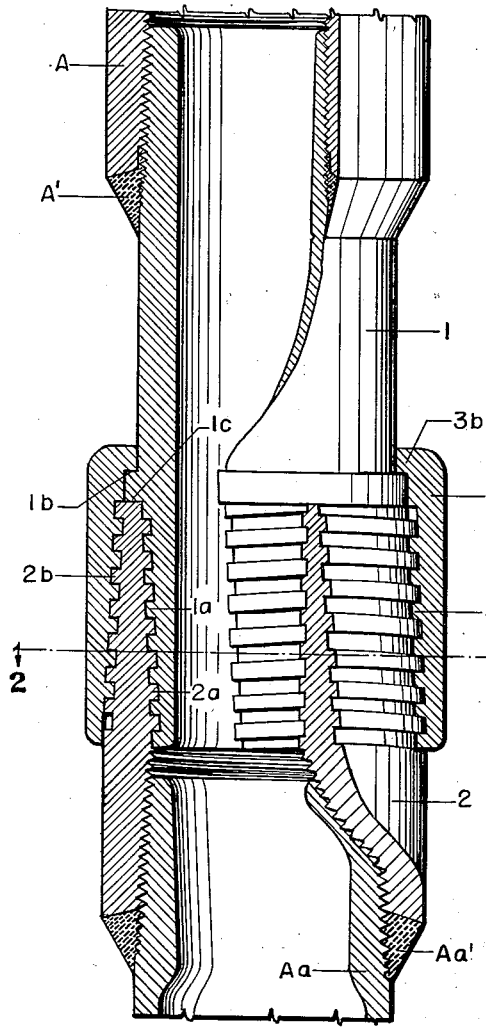
Fig. 1.
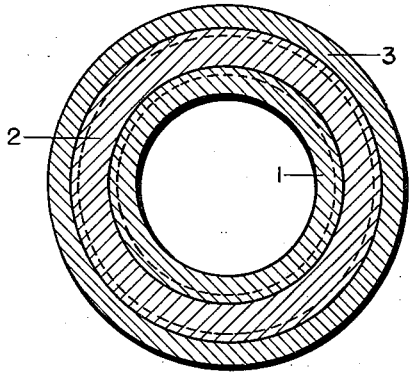
Fig. 2.
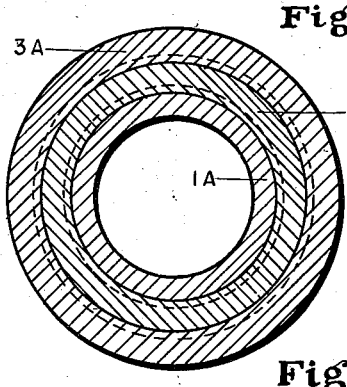
Fig. 3.
Fig. 4.
Alexander Boynton, Inventor,
By Jesse R. Stone & Lister B. Clark
Attorneys Patented Feb. 17, 1942

2,273,017

UNITED STATES PATENT OFFICE 2,273,017

RIGHT AND LEFT DRILL PIPE

Alexander Boynton, San Antonio, Tex.

Application June 30, 1939, Serial No. 282,164

1 Claim. (Cl. 285—146)

My invention relates to pipe connections, especially adapted for well drilling by the rotary method.

The principal object is to provide a connection which will enable the drill pipe to be rotated in either direction without danger of becoming unscrewed.

Another object is to provide greater strength in the connection than has been heretofore attainable with couplings of relatively small diameter.

Another object is to avoid the compression and bursting strains of ordinary pipe connections.

In attaining these objects, I employ a double set of threads, each set of a different pitch, or one right-hand and one left-hand set of threads which may or may not be of the same pitch. The rotary thrust in either direction is borne by abutting shoulders which also serve to make the joint leak-proof.

The mechanism employed to attain the foregoing objects will be explained in the following specification and illustrated in the accompanying drawing, in which—

Fig. 1 is mainly a longitudinal section through the preferred embodiment of the invention, the locking mechanism being shown partly in outside view.

Fig. 2 is a cross section on the line 2—2, Fig. 1.

Fig. 3 is a partial longitudinal section with portions of the device shown in elevation, illustrating a modified form of the invention.

Fig. 4 is a cross section on the line 4—4 Fig. 3.

Similar characters of reference are employed to designate similar parts throughout the several views.

The upper member 1 of the device is shown threadedly connected to the drill stem A and secured upon it by the weld A'. The lower member 2 of the device may be also threadedly joined to the drill stem Aa and secured to it by the weld Aa'.

The upper connection member 1 has right-hand spirals or threads 1a engageable with the right-hand threads 2a of the lower drill pipe connection member 2. When these threads are fully engaged, the annular external shoulder 1c of the member 1 will be engaged upon the upper end of the member 2.

The locking sleeve 3 has left-hand threads 3a engageable with the left-hand threads 2b of the connection member 2. When these threads are fully engaged, the internal flange 3b, having slight clearance with the member 1, is engaged upon the annular external shoulder 1b of the member 1.

It is apparent that the drill stem may be rotated in either direction without danger of this connection becoming unscrewed; because an anti-clockwise thrust of the member 1 will be opposed by the shoulder 1b engaging under the flange 3b. This left-hand thrust obviously will tighten the sleeve 3, having left-hand threaded engagement with the member 2.

In Fig. 3, illustrating the modified form, the upper drill pipe connection member 1A may have threaded connection with the upper drill pipe B, to which it may be secured by the weld B'. The lower drill pipe connection 2A may be threadedly joined to the lower drill pipe Ba and secured upon it by the weld Ba'. In either embodiment of the invention the proximate ends of the drill pipe may be fabricated into the upper and lower members of the device.

The member 1A has outside threads 1Aa adapted to engage with the internal threads 3Aa of the locking sleeve 3A. Likewise, the upper portion of the member 2A has its external threads 2Aa adapted to engage with the internal threads 3Aa of the locking sleeve 3A. It is apparent that the threads 1Aa must be of such length that the sleeve 3A can be turned upward far enough to disengage the member 2A.

The member 1A also has the smaller external threads 1Ab adapted to engage the similar internal threads 2Ab of the member 2A. When these threads 1Ab and 2Ab are fully engaged, the annular external shoulder 1Ac of the member 1A will engage upon the upper end of the member 2A, as appears in Fig. 3.

Before forming the assembly, the sleeve 3A will be turned upward far enough upon the member 1A to allow the smaller threads to become fully engaged. After the threads 1Ab and 2Ab have been fully engaged, the sleeve 3A will be turned downward until it locks upon the annular external shoulder 2Ac.

Manifestly, all threads may be right-hand or all may be left-hand, or one may be right and the other left, but in either combination, the two sets of threads must be of different pitches, as appears.

The invention as herein illustrated and described is manifestly subject to many changes in construction and arrangement of parts which will remain within the scope and purpose of the stated objects and appended claim.

What is claimed is:

In a rotary drill connection, a connection member having threads thereon adjacent an end thereof, an annular projection on said member and adjacent that portion of said threads removed from said end, said annular projection providing two annular shoulders, a second connection member having threads thereon mating with said first mentioned threads in such a manner that a portion of said second connection member is seated firmly against one of said annular shoulders, a locking sleeve threadedly connected with said second connection member by threads of opposite hand to said second threads, a projection on said locking sleeve constructed to seat firmly against the second of said annular shoulders whereby the assembly as a whole may be rotated in either direction without danger of becoming disconnected.

ALEXANDER BOYNTON.